United States Patent
Tanabe et al.

(10) Patent No.: US 9,736,295 B2
(45) Date of Patent: Aug. 15, 2017

(54) MOBILE ELECTRONIC DEVICE, CONTROL METHOD, AND STORAGE MEDIUM

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/107,461

(22) PCT Filed: Dec. 24, 2014

(86) PCT No.: PCT/JP2014/084126
§ 371 (c)(1),
(2) Date: Jun. 23, 2016

(87) PCT Pub. No.: WO2015/098953
PCT Pub. Date: Jul. 2, 2015

(65) Prior Publication Data
US 2016/0323439 A1    Nov. 3, 2016

(30) Foreign Application Priority Data
Dec. 24, 2013 (JP) .................................. 2013-265076

(51) Int. Cl.
*H04W 4/02* (2009.01)
*H04M 1/725* (2006.01)
*H04W 4/04* (2009.01)

(52) U.S. Cl.
CPC ... *H04M 1/72572* (2013.01); *H04M 1/72569* (2013.01); *H04W 4/028* (2013.01); *H04W 4/043* (2013.01); *H04M 2250/12* (2013.01)

(58) Field of Classification Search
None
See application file for complete search history.

(56) References Cited

U.S. PATENT DOCUMENTS

2014/0088860 A1* 3/2014 Poornachandran .... G01C 21/16
 701/410
2014/0344718 A1* 11/2014 Rapaport ................ H04L 51/32
 715/753

(Continued)

FOREIGN PATENT DOCUMENTS

JP    2007-18472 A    1/2007
JP    2009-210473 A    9/2009

OTHER PUBLICATIONS

International Search Report in International Application No. PCT/JP2014/084126, mailed Feb. 3, 2015.

*Primary Examiner* — Diane Mizrahi
(74) *Attorney, Agent, or Firm* — Hauptman Ham, LLP

(57) ABSTRACT

In an aspect of embodiments, a mobile electronic device includes a storage, a display, an atmospheric pressure measurement module, a determinator, and a position corrector. The storage stores a floor map for each of floors in a building. The display displays a current position of an own device in the floor on the floor map. The atmospheric pressure measurement module measures atmospheric pressure acting on the own device. The determinator determines whether the own device is moving between the floors based on a change in the atmospheric pressure. The position corrector corrects the current position of the own device to be displayed on the floor map when the determinator determines that the own device is moving between the floors.

6 Claims, 6 Drawing Sheets

(56) References Cited

U.S. PATENT DOCUMENTS

2015/0281910 A1* 10/2015 Choudhury ............. G01S 5/021
                                                          455/456.1
2016/0306051 A1* 10/2016 Hirabayashi ........... G01C 21/20

* cited by examiner

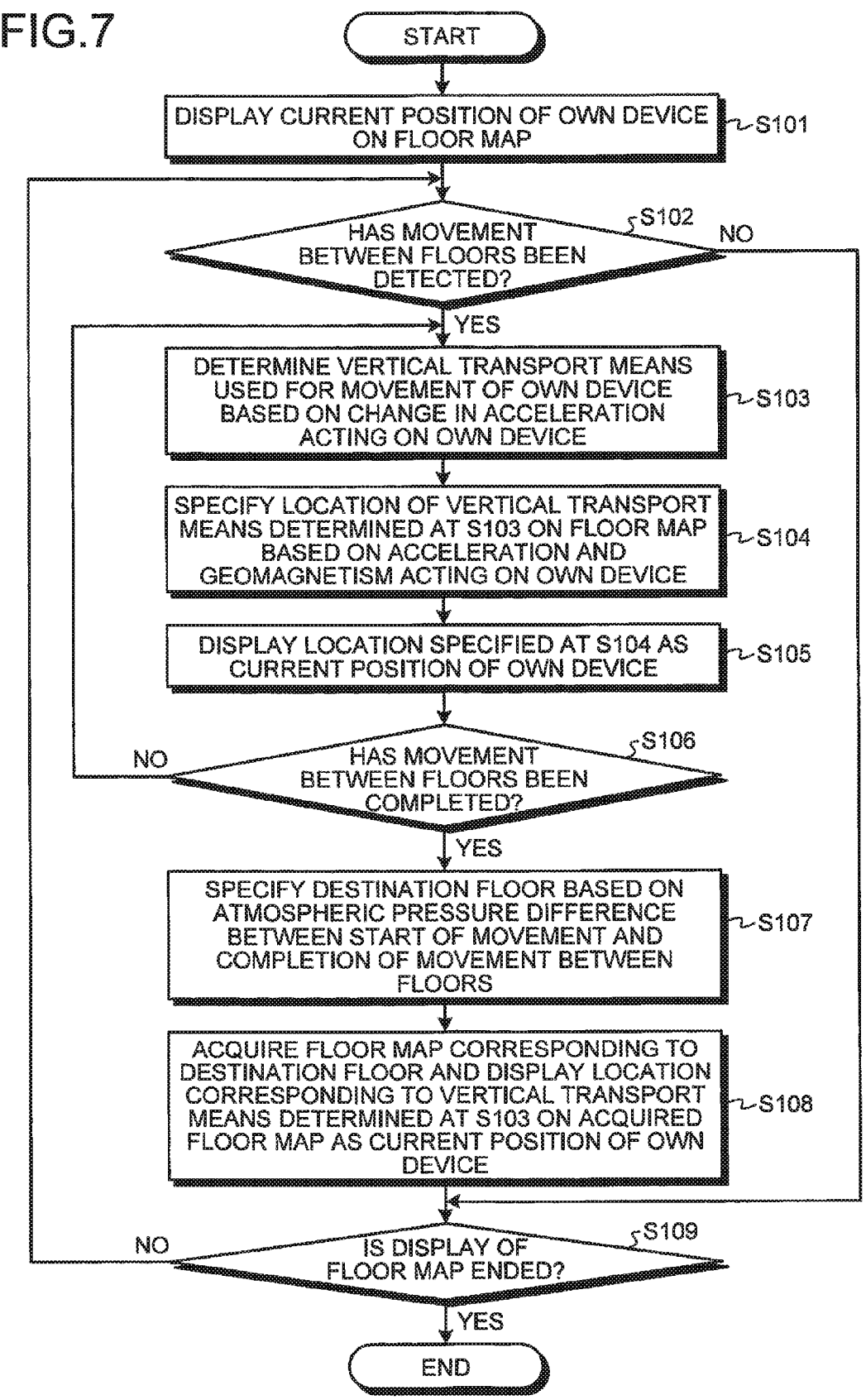

MOBILE ELECTRONIC DEVICE, CONTROL METHOD, AND STORAGE MEDIUM

RELATED APPLICATIONS

The present application is a National Phase entry of International Application No. PCT/JP2014/084126, filed Dec. 24, 2014, which claims priority of Japanese Application No. 2013-265076, filed Dec. 24, 2013.

FIELD

The present application relates to a mobile electronic device, a control method, and a storage medium.

BACKGROUND

Conventionally, some of communicable mobile electronic devices such as mobile phones and smartphones have a function of displaying a current position measured by using GPS (Global Positioning System) on a map (see Patent Literature 1).

CITATION LIST

Patent Literature

Patent Literature 1: Japanese Patent Application Laid-open No. 2007-018472

SUMMARY

Incidentally, many of mobile electronic devices such as mobile phones measure a position thereof by using GPS (Global Positioning System), but there is a problem in the accuracy of a position measured in a building.

According to embodiments, there is provided a mobile electronic device comprising: a storage configured to store information for a floor map for each of floors in a building; a display configured to display a current position of an own device in the floor on the floor map; a sensor configured to measure atmospheric pressure acting on the own device; and at least one controller configured to determine whether the own device is moving between the floors based on a change in the atmospheric pressure, to correct the current position of the own device to be displayed on the floor map when the own device is moving between the floors, and to cause the display to display the corrected position.

According to embodiments, there is provided a control method for controlling a mobile electronic device including a storage configured to store a floor map for each of floors in a building, a display configured to display a current position of an own device in the floor on the floor map, and a sensor configured to measure atmospheric pressure acting on the own device, the control method comprising: determining whether the own device is moving between the floors based on a change in the atmospheric pressure; and correcting the current position of the own device to be displayed on the floor map when the own device is moving between the floors.

According to embodiments, there is provided a non-transitory storage medium having a control program configured to cause a mobile electronic device, including a storage configured to store a floor map for each of floors in a building, a display configured to display a current position of an own device in the floor on the floor map, and a sensor configured to measure atmospheric pressure acting on the own device, execute: determining whether the own device is moving between the floors based on a change in the atmospheric pressure; and correcting the current position of the own device to be displayed on the floor map when the own device is moving between the floors.

BRIEF DESCRIPTION OF DRAWINGS

FIG. 7 is a flowchart illustrating an example of a procedure performed by a mobile phone 100 according to the embodiments.

DESCRIPTION OF EMBODIMENTS

A plurality of embodiments for realizing a mobile electronic device, a control method, and a control program provided in a storage medium according to the present application will be explained in detail below with reference to the accompanying drawings. A mobile phone will be explained below as an example of the mobile electronic device. In the following embodiments, an example in which a user of the mobile phone 100 is visiting a building having a plurality of floors will be explained.

Embodiments

Figure 1:
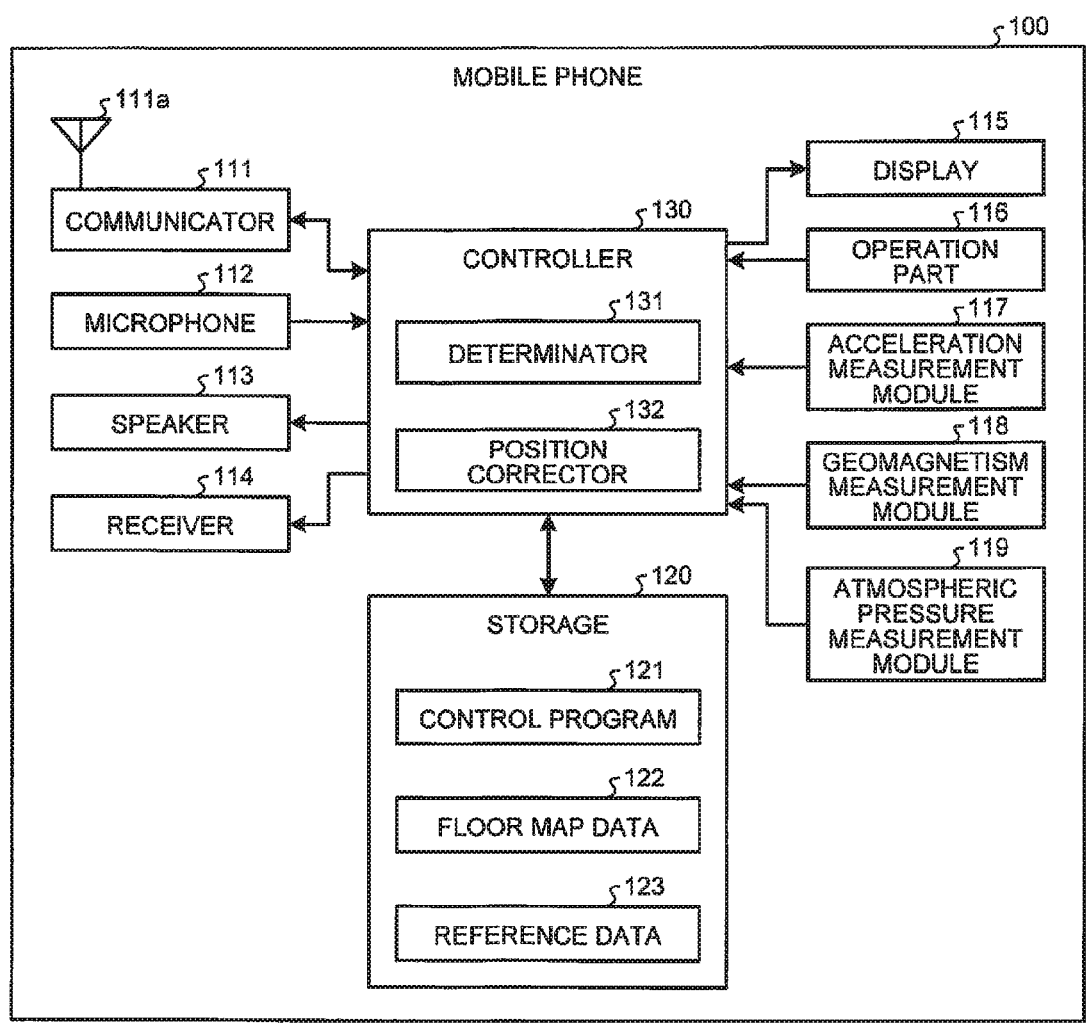
FIG. 1 is a block diagram illustrating a functional configuration of a mobile phone according to an example of a plurality of embodiments.

A functional configuration of a mobile phone according to the embodiments will be explained below with reference to FIG. 1. FIG. 1 is a block diagram illustrating the functional configuration of a mobile phone according to an example of the embodiments. In the following explanation, the mobile phone 100 may be described as "own device". In the explanation herein below, same reference signs may be assigned to similar components. Moreover, the overlapping explanation may be omitted.

As illustrated in FIG. 1, the mobile phone 100 includes a communicator 111, a microphone 112, a speaker 113, a receiver 114, a display 115, an operation part 116, an acceleration measurement module (also called "an acceleration sensor") 117, a geomagnetism measurement module (also called "a geomagnetism sensor") 118, an atmospheric pressure measurement module (also called "a sensor") 119, a storage 120, and a controller 130.

The communicator 111 performs communication via a communication network. The communicator 111 has an antenna 111a. The communicator 111 establishes a wireless signal line with a base station via, for example, a channel allocated by the base station. The communicator 111 performs telephone communication and information communication with other devices via, for example, the base station. The wireless signal line is established with the base station using a CDMA (Code Division Multiple Access) system or so.

The communicator 111 may be configured to receive a radio signal of a predetermined frequency band from GPS satellites in order to, for example, perform position measurement processing executed in the controller 130. For example, the communicator 111 performs demodulation processing of the radio signal received from the GPS satellites and transmits the processed signal to the controller 130. The mobile phone 100 may provide a receiver, separately from the communicator 111, for receiving a radio signal of a predetermined frequency band from the GPS satellites.

The microphone 112 inputs, for example, a voice signal upon a voice call. The speaker 113 is provided, for example, inside a housing of the mobile phone 100. The speaker 113 outputs a ringtone of a voice call and a sound upon transmission and reception of mail, and the like. The receiver 114 outputs, for example, a voice signal upon a voice call.

The display 115 displays various types of information such as texts, graphics, and images according to a signal input from the controller 130. In the embodiments, the display 115 displays a floor map of the building which the user of the mobile phone 100 is visiting, and the like. The display 115 is configured to include a display panel such as a liquid crystal display and an organic electro-luminescence display. The display 115 is an example of displays.

The operation part 116 receives an operation of the user and transmits a signal according to the received operation to the controller 130. The operation part 116 is configured to include, for example, one or more devices for receiving operations of the user. The device includes, for example, a key, a button, and a touch screen. In the embodiments, the operation part 116 receives an operation to display the floor map on the display 115 from the user.

The acceleration measurement module 117 measures acceleration acting on the mobile phone 100 (own device). The acceleration measurement module 117 transmits the information of the measured acceleration to the controller 130. The acceleration measurement module 117 is an example of acceleration measurement modules.

The geomagnetism measurement module 118 measures geomagnetism acting on the mobile phone 100 (own device). The geomagnetism measurement module 118 transmits the information of the measured geomagnetism to the controller 130. The geomagnetism measurement module 118 is an example of geomagnetism measurement modules.

The atmospheric pressure measurement module 119 measures atmospheric pressure at the current position of the mobile phone 100 (own device). The atmospheric pressure measurement module 119 transmits the information of the measured atmospheric pressure to the controller 130. The atmospheric pressure measurement module 119 is an example of atmospheric pressure measurement modules.

The storage 120 stores programs and data. The storage 120 is used also as a working area that temporarily stores a processing result of the controller 130. The storage 120 may be configured to include any non-transitory storage medium such as a semiconductor storage medium and a magnetic storage medium. The storage 120 may be configured to include a plurality of types of storage medium. The storage 120 may be configured to include a combination of a portable storage medium such as a memory card, an optical disk, or a magneto-optical disk with a reading device of the storage medium. The storage 120 may be configured to include a storage device used as a temporary storage area such as RAM (Random Access Memory).

In the embodiments, the storage 120 stores, for example, a control program 121, floor map data 122, and reference data 123 as illustrated in FIG. 1.

Figure 2:
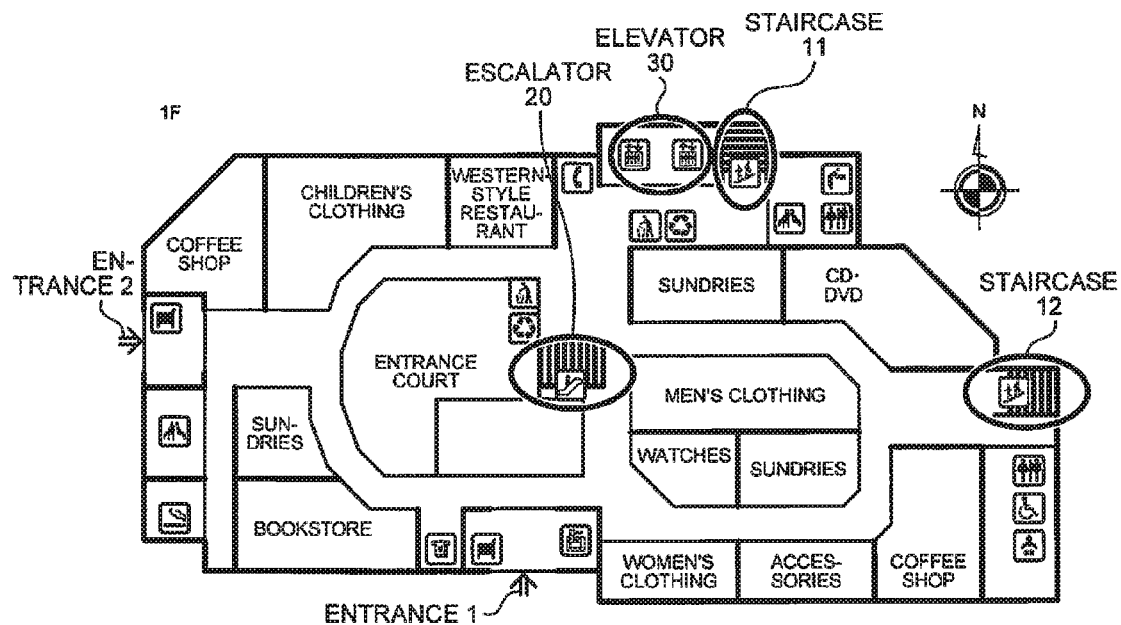
FIG. 2 is a diagram illustrating a display example of floor map data.
Figure 3:
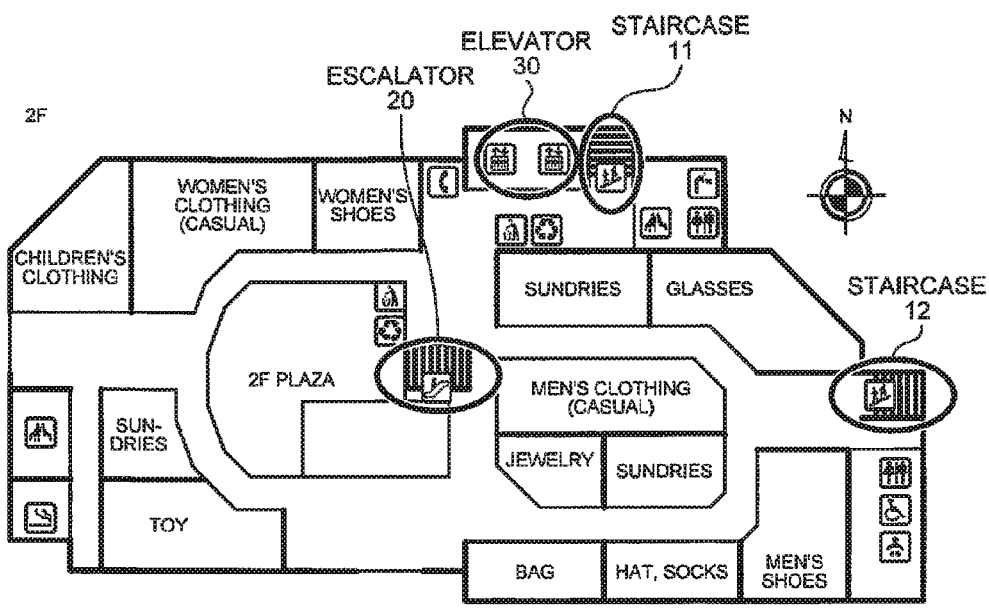
FIG. 3 is a diagram illustrating a display example of the floor map data.

The floor map data 122 is information for a floor map related to each floor in the building which the own device (user carrying the own device) is visiting. The floor map data 122 includes information for stores belonging to each floor and information for locations of staircases, an escalator, and an elevator for going up and down between floors. FIG. 2 and FIG. 3 are diagrams illustrating display examples of the floor map data. FIG. 2 is a diagram illustrating a display example of a floor map corresponding to a first floor of the building. FIG. 3 is a diagram illustrating a display example of a floor map corresponding to a second floor of the building. As illustrated in FIG. 2, in addition to the stores, locations of entrances 1 and 2, staircases 11 and 12, an escalator 20, an elevator 30, and the like are displayed on the floor map corresponding to the first floor of the building displayed on the display 115. As illustrated in FIG. 3, in addition to the stores, locations of the staircases 11 and 12, the escalator 20, the elevator 30, and the like are displayed on the floor map corresponding to the second floor of the building displayed on the display 115. The staircases 11 and 12 illustrated in FIG. 2 and the staircases 11 and 12 illustrated in FIG. 3 are the same constructions as each other to move between floors in the building. The escalator 20 illustrated in FIG. 2 and the escalator 20 illustrated in FIG. 3 are the same transport device as each other to move between floors in the building. The elevator 30 illustrated in FIG. 2 and the elevator 30 illustrated in FIG. 3 are the same vertical transport equipment as each other to move between floors in the building.

The floor map data 122 may be configured to store information for a plurality of buildings. The floor map data 122 may include information for the height of the floor from the ground surface. The floor map data 122 is an example of information for the floor map. The staircases 11 and 12, the escalator 20, and the elevator 30 are examples of vertical transport means.

The reference data 123 is information for acceleration acting on the own device while the user is moving using the vertical transport means used to move between the floors. The reference data 123 corresponds to a time series pattern (or vector), or the like, of each acceleration acting on the own device while he/she is moving using the staircase, using the escalator, and using the elevator. The reference data 123 is referred to in order that a determinator 131 of the controller 130, which is explained later, determines to which of the staircases 11 and 12, the escalator 20, and the elevator 30 the vertical transport means used for the movement of the own device corresponds, based on the acceleration measured by the acceleration measurement module 117. The reference data 123 is an example of reference information.

The control program 121 provides a function of determining whether the own device is moving between the floors based on the change in atmospheric pressure. The control program 121 provides a function of correcting, when it is determined that the own device is moving between the floors, the current position of the own device to be displayed on the floor map and displaying the corrected current position on the display 115. The control program 121 provides a function of determining, when it is determined that the own device is moving between the floors, a vertical transport means to be used for movement of the own device based on the acceleration acting on the own device and the reference data 123. The control program 121 determines a moving direction of the own device based on the acceleration and the geomagnetism acting on the own device. The control program 121 specifies the location of the vertical transport means on the floor which is determined as having been used for movement of the own device, based on the determined moving direction. The control program 121 provides a function of displaying the specified location as the current position of the own device. The control program 121 provides a function of specifying, when it is determined that the own device is moving between the floors, a destination floor which is a movement destination of the own device based on an atmospheric pressure difference between the start of the movement and the completion of the movement between the floors. The control program 121 acquires a destination floor map corresponding to the destination floor from the storage 120. The control program 121 provides a function of displaying the location of the vertical transport means determined as having been used for the movement of the own device on the destination floor map as the current position of the own device on the destination floor.

The controller 130 is a processor. Examples of the processor are configured to include, but are not limited to, a CPU (Central Processing Unit), SoC (System-on-a-chip), an MCU (Micro Control Unit), an FPGA (Field-Programmable Gate Array), and a coprocessor. The controller 130 integrally controls the operations of the mobile phone 100 to implement various functions.

Specifically, the controller 130 executes commands included in the program stored in the storage 120 while referring to the data stored in the storage 120 as necessary. The controller 130 then controls a function module according to the data and the commands and thereby implements the various functions. Examples of the function module include, but are not limited to, the communicator 111, the speaker 113, the receiver 114, and the display 115. The controller 130 can change the control according to the detection result of a detector. Examples of the detector include, but are not limited to, the operation part 116, the acceleration measurement module 117, the geomagnetism measurement module 118, and the atmospheric pressure measurement module 119.

The controller 130 executes the control program 121 to implement the functions provided by the control program 121 as processing performed by the determinator 131 and as processing performed by a position corrector 132. The determinator 131 is an example of determinators, and the position corrector 132 is an example of position correctors.

The determinator 131 of the controller 130, thus the controller 130 performs the processing for determining whether the own device is moving between the floors based on the change in atmospheric pressure. When it is determined that the own device is moving between the floors, the determinator 131 performs the processing of determining the vertical transport means used for the movement of the own device based on the acceleration acting on the own device and the reference data 123. When it is determined that the own device is moving between the floors, the determinator 131 performs the processing of specifying a destination floor which is a movement destination of the own device based on an atmospheric pressure difference between the start of the movement and the completion of the movement between the floors.

The position corrector 132 of the controller 130, thus the controller 130 performs the processing of correcting, when the determinator 131 determines that the own device is moving between the floors, the current position of the own device to be displayed on the floor map and displaying the corrected current position on the display 115. Specifically, when the determinator 131 determines that the own device is moving between the floors, the position corrector 132 determines a moving direction of the own device based on the acceleration and the geomagnetism acting on the own device. The position corrector 132 specifies the location of the vertical transport means on the floor which is determined as having been used for the movement of the own device, based on the determined moving direction. The position corrector 132 performs the processing of displaying the specified location as the current position of the own device. The position corrector 132 acquires the floor map data 122 corresponding to the destination floor specified by the determinator 131 from the storage 120. The position corrector 132 performs the processing of displaying the location of the vertical transport means determined as having been used for movement of the own device on the destination floor map as the current position of the own device on the destination floor.

Figure 4:
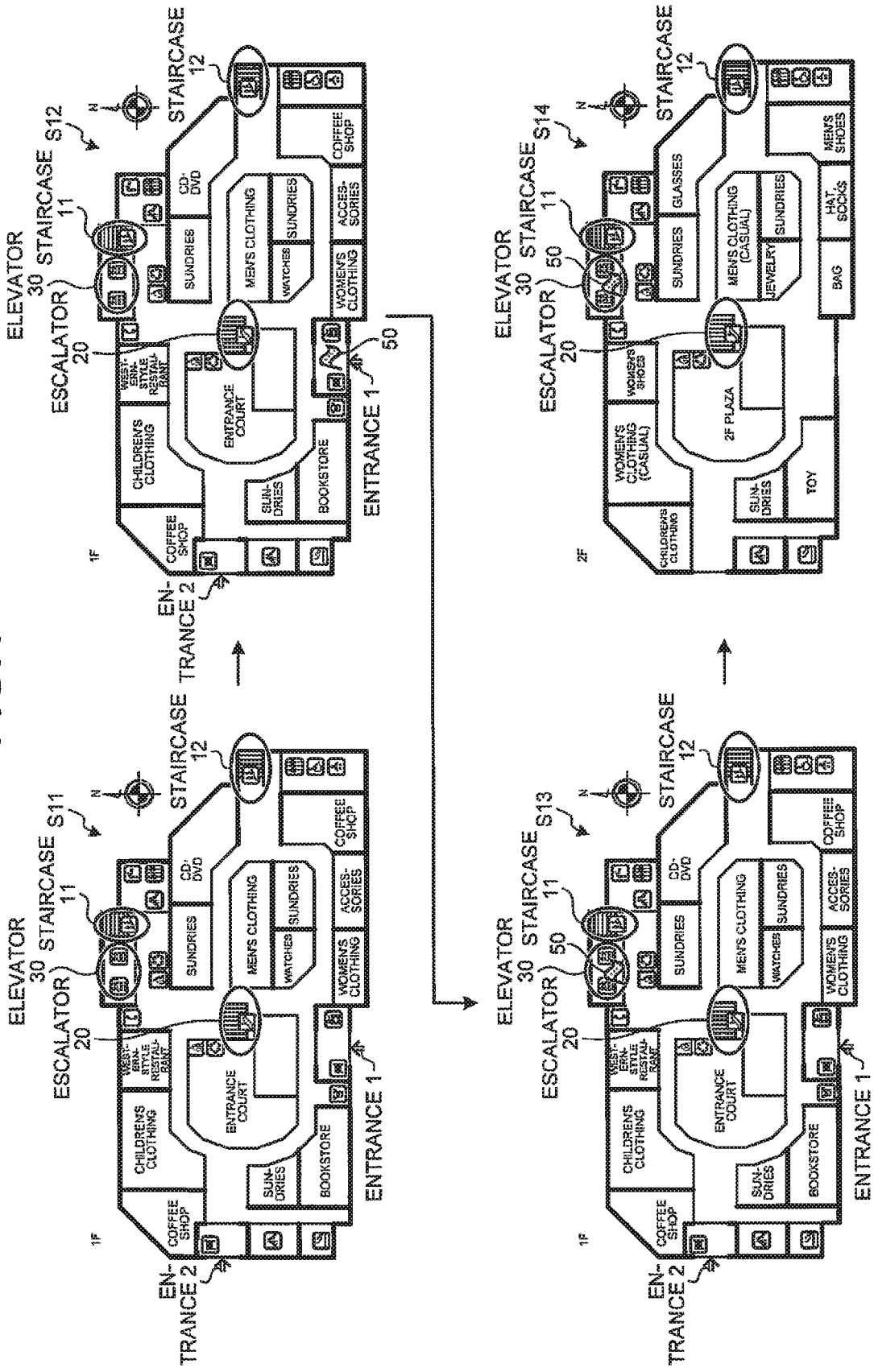
FIG. 4 is a diagram illustrating an example of processing performed by a controller 130 according to the embodiments.
Figure 5:
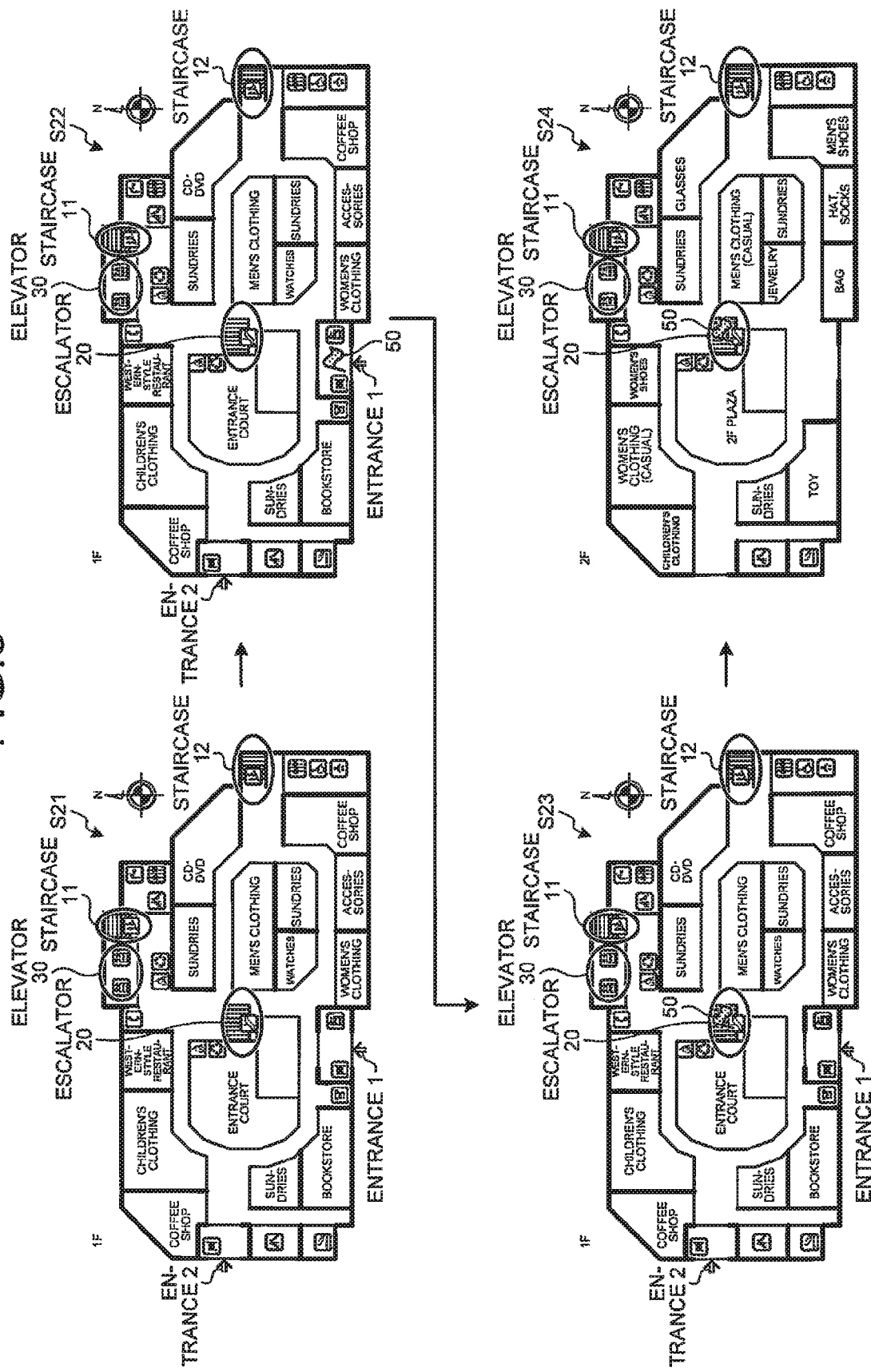
FIG. 5 is a diagram illustrating an example of processing performed by the controller 130 according to the embodiments.
Figure 6:
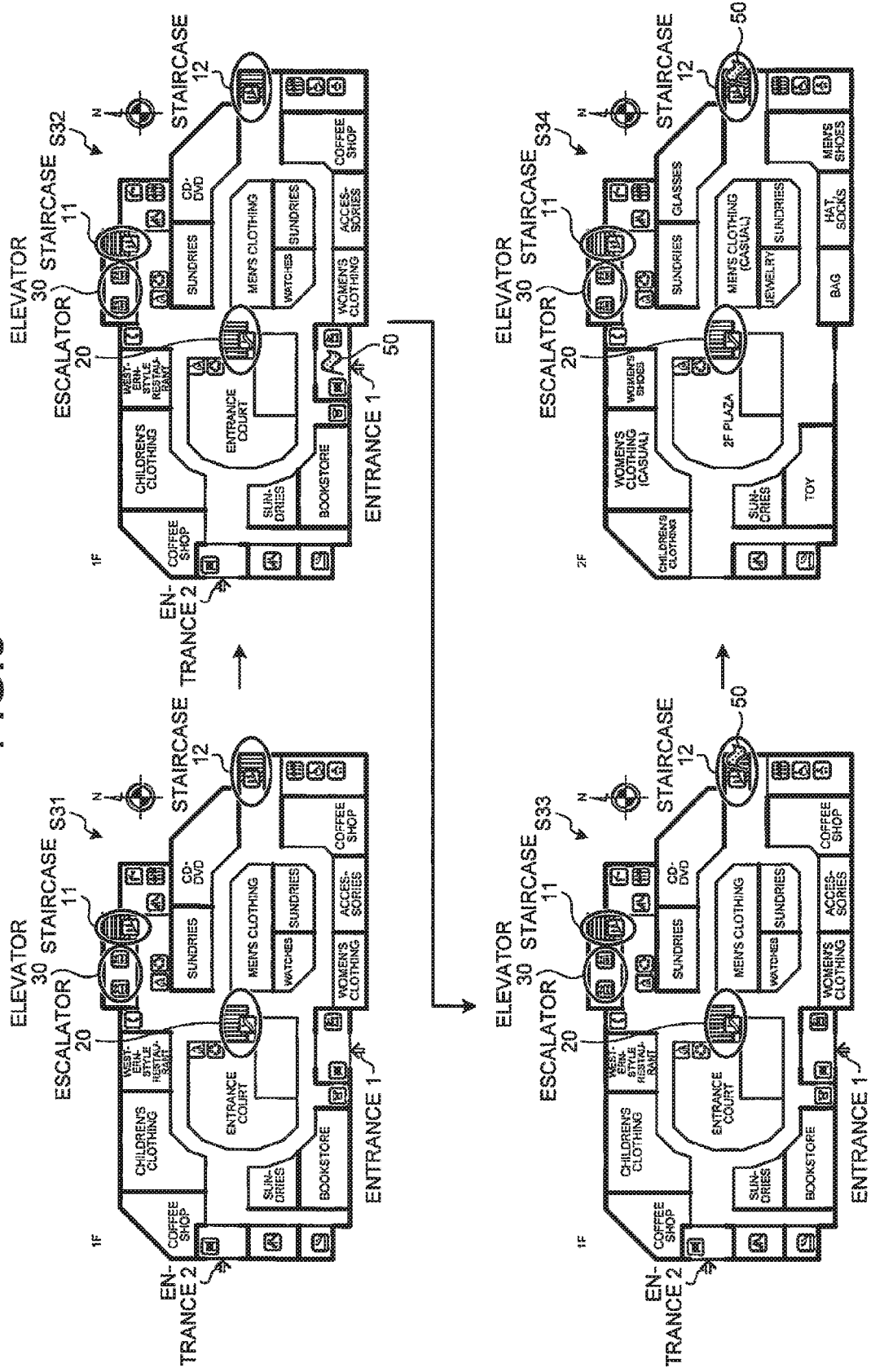
FIG. 6 is a diagram illustrating an example of processing performed by the controller 130 according to the embodiments.

Processing performed by the controller 130 will be explained below with reference to FIG. 4 to FIG. 6. FIG. 4 to FIG. 6 are diagrams illustrating examples of the processing performed by the controller 130 according to the embodiments. In the explanation herein below, it is assumed that the user performs an operation of displaying a floor map when entering the building from the outside.

An example of correcting and displaying the current position of the own device at the time of detecting the movement using the elevator 30 will be explained with reference to FIG. 4.

When receiving an operation of displaying a floor map on the display 115 from the user via the operation part 116, the controller 130 displays the floor map of the first floor of the building on the display 115 (Step S11). Subsequently, the controller 130 displays position information 50 indicating the current position of the own device on the floor map (Step S12). The controller 130 displays the position information 50 indicating the current position of the own device at an entrance reasonably and probably determined as "entrance" based on the position measured according to the radio signal received from the GPS satellites before the user enters the building. In the example illustrated in FIG. 4, the position information 50 is displayed at the entrance 1.

Subsequently, the controller 130 monitors the atmospheric pressure measured by the atmospheric pressure measurement module 119 and determines whether the movement between floors has been detected. When the movement between floors has been detected as a result of determination, the controller 130 determines the vertical transport means used for the movement of the own device based on the acceleration measured by the acceleration measurement module 117 and the reference data 123.

When it is determined that the vertical transport means used for the movement of the own device is an elevator, the controller 130 specifies a location on the first floor of the building where the elevator 30 is installed. In the example illustrated in FIG. 4, because one unit of elevator 30 is installed, the location of the elevator 30 on the floor map of the first floor of the building is used for the current position.

Subsequently, the controller 130 displays the position information 50 on the display 115, regarding the position of the elevator 30 used for the movement of the own device on the floor map of the first floor of the building as the current position of the own device (Step S13).

The controller 130 then determines whether the movement between floors has been completed. When the atmospheric pressure measured by the atmospheric pressure measurement module 119 falls within a range of predetermined value for a given period of time, the controller 130 determines that the movement between floors has been completed.

When it is determined that the movement between floors has been completed, the controller 130 specifies a destination floor which is a movement destination of the own device based on the atmospheric pressure difference between the start of the movement and the completion of the movement between the floors. The controller 130 determines that the own device is on the first floor of the building, for example, at the time of receiving the operation of displaying the floor map. The controller 130 determines the atmospheric pressure at the time of receiving the operation of displaying the floor map as atmospheric pressure at the time of starting the movement. Meanwhile, the controller 130 determines the atmospheric pressure at the time of determining that the movement between floors has been completed as atmospheric pressure at the time of completion of the movement. The controller 130 converts the atmospheric pressure difference between the atmospheric pressure at the time of starting the movement between floors and the atmospheric pressure at the completion of the movement into a height difference by using a general formula indicating a relationship between a height difference and an atmospheric pressure difference, and specifies the destination floor based on the converted height difference. In the example illustrated in FIG. 4, the controller 130 specifies the second floor as the destination floor.

Subsequently, the controller 130 acquires floor map data corresponding to the second floor of the building which is the destination floor from the storage 120. The controller 130 displays the location of the elevator 30 determined as having been used for the movement of the own device on the floor map of the second floor of the building which is the destination floor, as the position information 50 indicating the current position of the own device (Step S14).

In the example illustrated in FIG. 4, if a plurality of elevators are installed on the same floor of the building, it may be configured to specify an elevator used for the movement of the own device from the elevators under the condition that the own device can receive radio waves from a GPS satellite. For example, the controller 130 selects an elevator installed in a location nearest from the location measured based on the radio waves received from the GPS satellites, from the elevators installed on the first floor of the building, as the elevator used for the movement of the own device.

An example of correcting and displaying a current position of the own device at the time of detecting the movement using the escalator 20 will be explained below with reference to FIG. 5.

When receiving an operation of displaying the floor map on the display 115 from the user via the operation part 116, the controller 130 displays the floor map of the first floor of the building on the display 115 (Step S21). Subsequently, the controller 130 displays the position information 50 indicating the current position of the own device on the floor map (Step S22). In the example illustrated in FIG. 5, the position information 50 is displayed at the entrance 1.

Subsequently, the controller 130 monitors the atmospheric pressure measured by the atmospheric pressure measurement module 119 and determines whether the movement between floors has been detected. When the movement between floors has been detected as a result of determination, the controller 130 determines the vertical transport means being used for the movement of the own device based on the acceleration measured by the acceleration measurement module 117 and the reference data 123.

When it is determined that the vertical transport means used for the movement of the own device is the escalator 20, the controller 130 specifies the location on the first floor of the building where the escalator 20 is installed. In the example illustrated in FIG. 5, because one unit of escalator 20 is installed, the location of the escalator 20 on the floor map of the first floor of the building is used for the current position.

Subsequently, the controller 130 specifies the location on the floor map of the first floor of the building where the escalator 20 determined as being used for the movement of the own device is installed, and then displays the position information 50 indicating the specified location as a current position of the own device on the display 115 (Step S23).

The controller 130 then determines whether the movement between floors has been completed. When the atmospheric pressure measured by the atmospheric pressure measurement module 119 falls within a range of predetermined value for a given period of time, the controller 130 determines that the movement between floors has been completed.

When it is determined that the movement between floors has been completed, the controller 130 specifies a destination floor which is a movement destination of the own device based on the atmospheric pressure difference between the start of the movement and the completion of the movement between the floors. In the example illustrated in FIG. 5, the controller 130 specifies the second floor as the destination floor.

Subsequently, the controller 130 acquires floor map data corresponding to the second floor of the building which is the destination floor from the storage 120, and displays the location of the escalator 20 determined as having been used for the movement of the own device on the floor map of the second floor of the building which is the destination floor map, as the position information 50 indicating the current position of the own device (Step S24).

In the example illustrated in FIG. 5, if another escalator is installed in a different location on the first floor of the building, the controller 130 determines a moving direction of the own device based on the acceleration and the geomagnetism acting on the own device. The controller 130 may specify an escalator used for the movement of the own device based on the determined moving direction of the own device. Specifically, the controller 130 determines the moving direction of the own device based on an azimuth angle of the own device calculated by using the value of acceleration and the value of geomagnetism acting on the own device. For example, when looking down at the floors in the building in the vertical direction, wherein one escalator that reciprocates to go up Or go down) in the north-south direction and another escalator that reciprocates to go up (or go down) in the east-west direction are installed, the controller 130 specifies the escalator used for the movement of the own device depending on whether the moving direction of the own device is the north-south direction or the east-west direction. Alternatively, the controller 130 may specify an escalator used for the movement of the own device from the escalators installed in the same floor of the building under the condition that the own device can receive radio waves from the GPS satellites. For example, the controller 130 selects an escalator installed in a location nearest from the location measured based on the radio waves received from the GPS satellites, from the escalators installed in the first floor of the building, as the escalator used for the movement of the own device.

An example of correcting and displaying a current position of the own device at the time of detecting the movement using the staircase 12 will be explained below with reference to FIG. 6.

When receiving an operation of displaying the floor map on the display 115 from the user via the operation part 116, the controller 130 displays the floor map of the first floor of the building on the display 115 (Step S31). Subsequently, the controller 130 displays the position information 50 indicating the current position of the own device on the floor map (Step S32). In the example illustrated in FIG. 6, the position information 50 is displayed at the entrance 1.

Subsequently, the controller 130 monitors the atmospheric pressure measured by the atmospheric pressure measurement module 119 and determines whether the movement between floors has been detected. When the movement between floors has been detected as a result of determination, the controller 130 determines the vertical transport means being used for the movement of the own device based on the acceleration measured by the acceleration measurement module 117 and the reference data 123.

When it is determined that the vertical transport means used for the movement of the own device is the staircase, the controller 130 determines a moving direction of the own device based on the acceleration and the geomagnetism acting on the own device. The controller 130 specifies a staircase used for the movement of the own device based on the determined moving direction of the own device. In the example illustrated in FIG. 6, because there are the staircase 11 and the staircase 12, the controller 130 determines which of the staircase 11 and the staircase 12 is used for the movement between floors. Specifically, the controller 130 determines the moving direction of the own device based on an azimuth angle of the own device calculated by using the value of acceleration and the value of geomagnetism acting on the own device. For example, the controller 130 determines whether the moving direction of the own device is the north-south direction or the east-west direction when looking down at the floors in the building in the vertical direction. When the moving direction of the own device is the north-south direction, the controller 130 determines that the staircase 11 is used for the movement between the floors. When the moving direction of the own device is the east-west direction, the controller 130 determines that the staircase 12 is used for the movement between the floors. In the example illustrated in FIG. 6, the controller 130 determines that the staircase 12 is used for the movement between the floors.

Subsequently, the controller 130 displays the position information 50, indicating the location on the floor map of the first floor of the building where the staircase 12 used for the movement of the own device is installed as a current position of the own device, on the display 115 (Step S33).

The controller 130 then determines whether the movement between the floors has been completed. When the atmospheric pressure measured by the atmospheric pressure measurement module 119 falls within a range of predetermined value for a given period of time, the controller 130 determines that the movement between the floors has been completed.

When it is determined that the movement between the floors has been completed, the controller 130 specifies a destination floor which is a movement destination of the own device based on the atmospheric pressure difference between the start of the movement and the completion of the movement between the floors. In the example illustrated in FIG. 6, the controller 130 specifies the second floor as the destination floor.

Subsequently, the controller 130 acquires floor map data corresponding to the second floor of the building which is the destination floor from the storage 120. The controller 130 displays the location of the staircase 12 determined as having been used for the movement of the own device on the floor map of the second floor of the building which is the destination floor map, as the position information 50 indicating the current position of the own device (Step S34).

In the example illustrated in FIG. 6, the controller 130 may specify a staircase used for the movement of the own device from the staircases installed on the same floor of the building under the condition that the own device can receive radio waves from the GPS satellites. For example, the controller 130 selects a staircase installed in a location nearest from the location measured based on the radio waves received from the GPS satellites, from the staircases installed on the first floor of the building, as the staircase used for the movement of the own device.

An example of a procedure performed by the mobile phone 100 according to the embodiments will be explained below with reference to FIG. 7. FIG. 7 is a flowchart illustrating an example of the procedure performed by the mobile phone 100 according to the embodiments. The procedure illustrated in FIG. 7 is implemented by the controller 130 executing the control program 121 or the like stored in the storage 120.

As illustrated in FIG. 7, the controller 130 displays the current position of the own device on the floor map displayed on the display 115 (Step S101).

Subsequently, the controller 130 monitors the atmospheric pressure measured by the atmospheric pressure measurement module 119 and determines whether the movement between floors has been detected (Step S102).

When the movement between floors has been detected as a result of determination (Yes at Step S102), the controller 130 acquires acceleration acting on the own device from the acceleration measurement module 117. The controller 130 determines the vertical transport means being used for the movement of the own device based on the change in the acquired acceleration acting on the own device (Step S103).

Subsequently, the controller 130 acquires geomagnetism acting on the own device from the geomagnetism measurement module 118. The controller 130 specifies the location of the vertical transport means determined at S103 on the floor map based on the acquired acceleration and geomagnetism acting on the own device (Step S104).

The controller 130 then displays the location specified at S104 on the display 115 as the current position of the own device (Step S105).

Subsequently, the controller 130 determines whether the movement between floors has been completed (Step S106). When the movement between floors has been completed as a result of determination (Yes at Step S106), the controller 130 specifies a destination floor based on an atmospheric pressure difference between the start of the movement and the completion of the movement between the floors (Step S107).

Subsequently, the controller 130 acquires the floor map data 122 corresponding to the destination floor from the storage 120. The controller 130 displays the location corresponding to the vertical transport means determined at S103 on the floor map corresponding to the acquired floor map data on the display 115 as the current position of the own device (Step S108).

The controller 130 then determines whether the display of the floor map is to be ended (Step S109). The controller 130 ends the display of the floor map at a time of, for example, execution of other applications, start of communication, or a display end operation performed by the user.

When the display of the floor map is to be ended as a result of determination (Yes at Step S109), the controller 130 ends the processing illustrated in FIG. 7. On the other hand, when the display of the floor map is not ended as a result of determination (No at Step S109), the controller 130 returns to the procedure at S102.

When the movement between floors has not been completed as a result of determination at S106 (No at Step S106), the controller 130 returns to the procedure at S103.

When the movement between floors has not been detected as a result of determination at S102 (No at Step S102), the controller 130 proceeds to the procedure at S109.

In the embodiments, the mobile phone 100 performs the processing of correcting, when the determinator 131 determines that the own device is moving between floors, the current position of the own device to be displayed on the floor map and displaying the corrected current position on the display 115. Specifically, when there is a change in the atmospheric pressure acting on the own device, the mobile phone 100 determines that the own device is moving between floors using a vertical transport means in the building, and determines that the location of the vertical transport means corresponds to the current position of the own device. The position information in the building measured by using the GPS is less accurate even if it can be acquired. The position information in the building measured by using the GPS is not sufficient for the user as the information indicating the position of the own device in the building. Meanwhile, in the embodiments, the mobile phone 100 detects the movement between floors due to the change in the atmospheric pressure and determines the vertical transport means used for the movement between floors based on the data such as the acceleration and the geomagnetism. The determined location of the vertical transport means on the floor map can be used with being regarded as the current position of the own device. In other words, according to the embodiments, the mobile phone 100 can provide useful information as the current position of the user in the building even if the position information cannot be measured by using the GPS or so.

When a radio wave received from GPS satellites is weak due to being inside the building and the accuracy of position information measured by using the received radio wave is in a bad state, the mobile phone 100 can also use the location of the vertical transport means, used for the movement of the own device between floors, to correct the position information measured by using the radio wave received from the GPS satellites.

In the embodiments, for example, the control program 121 illustrated in FIG. 1 may be divided into a plurality of program modules respectively corresponding to the determinator 131 and the position corrector 132 of the controller 130. Alternatively, the control program 121 illustrated in FIG. 1 may be combined with the other programs.

In the embodiments, the mobile phone has been explained as an example of the mobile electronic device according to the appended claims; however, the mobile electronic device according to the appended claims is not limited to the mobile phone. The mobile electronic device according to the appended claims may be any electronic device other than the mobile phone if the device can measure atmospheric pressure, acceleration, and geomagnetism.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. A mobile electronic device, comprising:
    a storage configured to store
        (i) a floor map for each of floors in a building, said floor map including a plurality of vertical transport devices that have different azimuth angles when looking down at the floor map in a vertical direction, and
        (ii) reference information regarding acceleration acting on the mobile electronic device while moving using one of the vertical transport devices for moving between the floors in the building;
    a display configured to display a current position of the mobile electronic device in the floor on the floor map;
    an atmospheric pressure sensor configured to measure atmospheric pressure acting on the mobile electronic device;
    an acceleration sensor configured to measure the acceleration acting on the mobile electronic device;
    a geomagnetism sensor configured to measure geomagnetism acting on the mobile electronic device; and
    at least one controller configured to
        determine whether the mobile electronic device is moving between the floors based on a change in the atmospheric pressure measured by the atmospheric pressure sensor,
        determine that the mobile electronic device is moving between the floors by using one of the vertical transport devices based on the acceleration measured by the acceleration sensor and the reference information stored in the storage,
        determine an azimuth angle of the mobile electronic device and a moving direction of the mobile electronic device based on the acceleration measured by the acceleration sensor and the geomagnetism measured by the geomagnetism sensor,
        specify a location of said one of the vertical transport devices determined as being used for a movement of the mobile electronic device based on the determined moving direction and the determined azimuth angle, and
        cause the display to display the specified location as the current position of the mobile electronic device.

2. The mobile electronic device according to claim 1, wherein
    the at least one controller is configured to
        specify, when the mobile electronic device is moving between the floors, a destination floor which is a movement destination of the mobile electronic device based on an atmospheric pressure difference between a start of the movement of the mobile electronic device and completion of the movement of the mobile electronic device between the floors,
        acquire information for a destination floor map corresponding to the destination floor from the storage, and
        cause the display to display a location of said one of the vertical transport devices determined as being used for the movement of the mobile electronic device on the destination floor as the current position of the mobile electronic device on the destination floor map.

3. A control method of controlling a mobile electronic device including
a storage configured to store a floor map for each of floors in a building,
a display configured to display a current position of the mobile electronic device in the floor on the floor map,
an atmospheric pressure sensor configured to measure atmospheric pressure acting on the mobile electronic device,
an acceleration sensor configured to measure acceleration acting on the mobile electronic device, and
a geomagnetism sensor configured to measure geomagnetism acting on the mobile electronic device, the control method comprising:
storing (i) the floor map for each of the floors in the building, said floor map including a plurality of vertical transport devices that have different azimuth angles when looking down at the floor map in a vertical direction, and (ii) reference information regarding the acceleration acting on the mobile electronic device while moving using one of the vertical transport devices for moving between the floors in the building,
measuring the atmospheric pressure acting on the mobile electronic device;
measuring the acceleration acting on the mobile electronic device;
measuring the geomagnetism acting on the mobile electronic device;
determining whether the mobile electronic device is moving between the floors based on a change in the atmospheric pressure measured by the atmospheric pressure sensor;
determining that the mobile electronic device is moving between the floors by using one of the vertical transport devices based on the acceleration measured by the acceleration sensor and the reference information stored in the storage;
determining an azimuth angle of the mobile electronic device and a moving direction of the mobile electronic device based on the acceleration measured by the acceleration sensor and the geomagnetism measured by the geomagnetism sensor;
specifying a location of said one of the vertical transport devices determined as being used for a movement of the mobile electronic device based on the determined moving direction and the determined azimuth angle; and
displaying the specified location as the current position of the mobile electronic device on the display.

4. A non-transitory storage medium having a control program configured to cause a mobile electronic device, including a storage configured to store a floor map for each of floors in a building, a display configured to display a current position of the mobile electronic device in the floor on the floor map, an atmospheric pressure sensor configured to measure atmospheric pressure acting on the mobile electronic device, an acceleration sensor configured to measure acceleration acting on the mobile electronic device, and a geomagnetism sensor configured to measure geomagnetism acting on the mobile electronic device, to execute:
storing (i) the floor map for each of the floors in the building, said floor map including a plurality of vertical transport devices that have different azimuth angles when looking down at the floor map in a vertical direction, and (ii) reference information regarding acceleration acting on the mobile electronic device while moving using one of the vertical transport devices for moving between the floors in the building,
measuring the atmospheric pressure acting on the mobile electronic device;
measuring the acceleration acting on the mobile electronic device;
measuring the geomagnetism acting on the mobile electronic device;
determining whether the mobile electronic device is moving between the floors based on a change in the atmospheric pressure measured by the atmospheric pressure sensor;
determining that the mobile electronic device is moving between the floors by using one of the vertical transport devices based on the acceleration measured by the acceleration sensor and the reference information stored in the storage;
determining an azimuth angle of the mobile electronic device and a moving direction of the mobile electronic device based on the acceleration measured by the acceleration sensor and the geomagnetism measured by the geomagnetism sensor;
specifying a location of said one of the vertical transport devices determined as being used for a movement of the mobile electronic device based on the determined moving direction and the determined azimuth angle; and
displaying the specified location as the current position of the mobile electronic device on the display.

5. The mobile electronic device according to claim 1, wherein the at least one controller is configured to determine the moving direction of the mobile electric device based on the determined azimuth angle of the mobile electric device.

6. The mobile electronic device according to claim 5, wherein the at least one controller is configured to determine whether the moving direction of the mobile electric device is the north-south direction or the east-west direction when looking down at the floor map in the vertical direction.

* * * * *